C. H. GILL.
AUTOMATIC TRANSMISSION MECHANISM.
APPLICATION FILED AUG. 12, 1921.
1,432,684.
Patented Oct. 17, 1922.
2 SHEETS—SHEET 1.
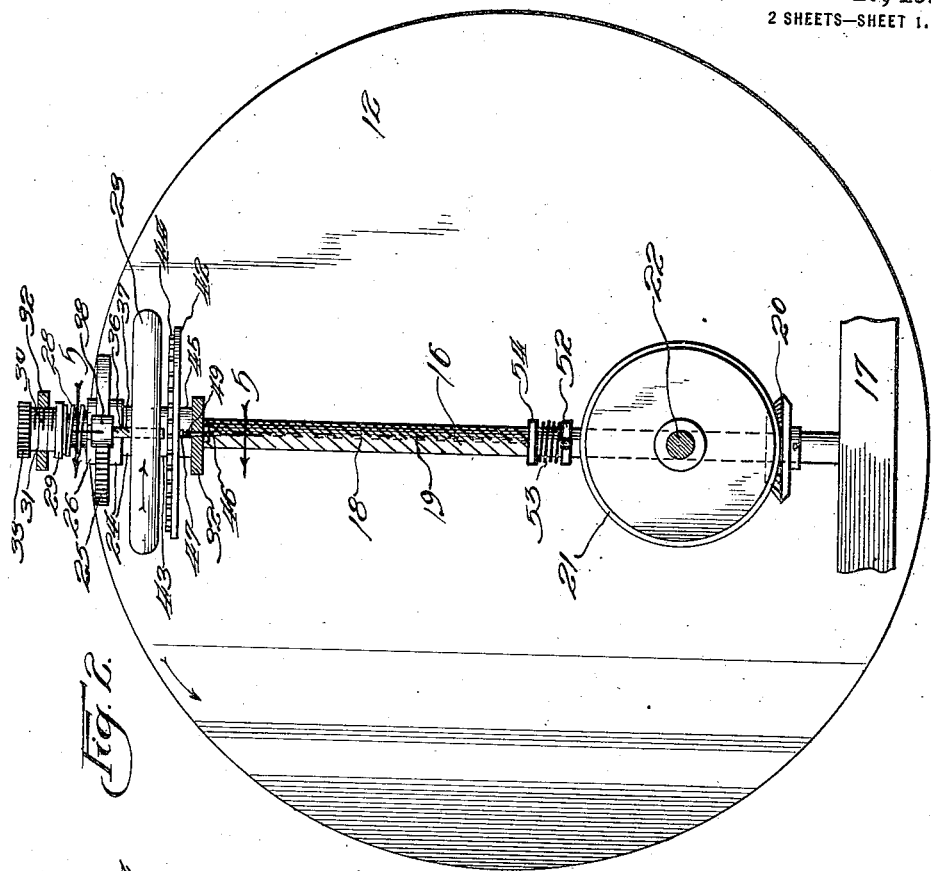
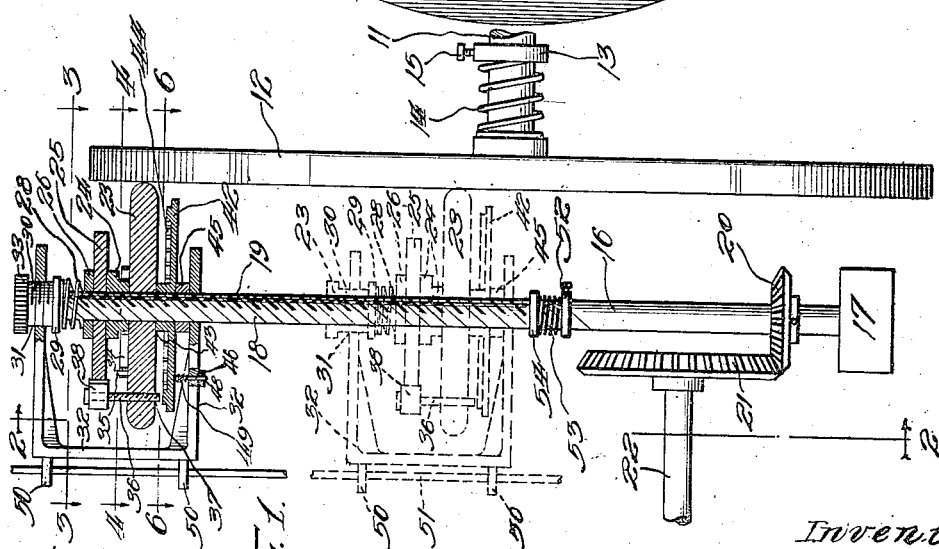
Inventor.
Charles H Gill
Witness:
Stephen Hilbra

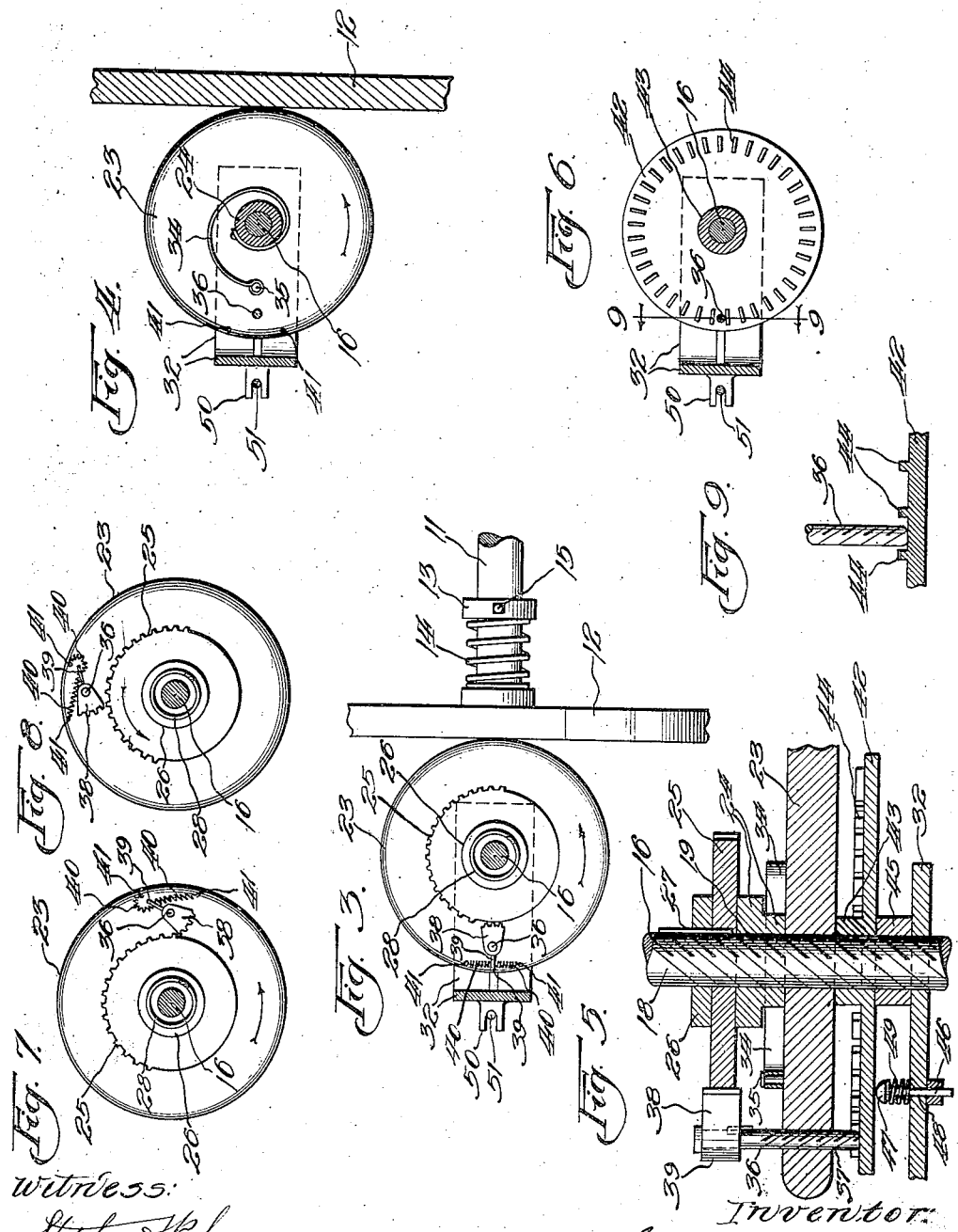

Patented Oct. 17, 1922.

1,432,684

UNITED STATES PATENT OFFICE.

CHARLES H. GILL, OF CHICAGO, ILLINOIS, ASSIGNOR OF ONE ONE-HUNDREDTH TO ERNEST L. FANTUS, OF CHICAGO, ILLINOIS.

AUTOMATIC TRANSMISSION MECHANISM.

Application filed August 12, 1921. Serial No. 491,734.

*To all whom it may concern:*

Be it known that I, CHARLES H. GILL, a citizen of the United States, residing at Chicago, in the county of Cook and State of Illinois, have invented a new and useful Automatic Transmission Mechanism, of which the following is a specification.

My invention relates to mechanisms for transmitting the rotary motion of a driving shaft to a driven shaft at varying ratios of speed therebetween and provided with automatic means for varying the said ratios to meet variations in the resistance offered to the rotation of the driven shaft. This invention is an improvement upon my friction transmission mechanism, filed April 17th, 1920, Serial No. 374,683, allowed June 30th, 1921, and upon my transmission mechanism, filed December 29th, 1920, Serial No. 433,930, and my self adjusting transmission mechanism, filed July 7th, 1921, Serial No. 483,106. Reference may be had to these several applications for Letters Patent in connection with the present application.

The construction disclosed herein is superior to any of the foregoing constructions in that it accomplishes the same purposes as those said constructions do but eliminates any necessity for slippage in the frictional engagement of the driving friction disk and the driven friction wheel. It further eliminates the necessity for almost constant slippage between the member splined upon the driven shaft and the flat surface of the friction driven wheel, as in my self adjusting transmission mechanism, above referred to, confining such slippage to times when reduction of the ratio of the speed of the driven shaft to the speed of the driving shaft is desirable, and not slipping at all under normal, even running conditions. Since slippage means wear, the advantage of avoiding an excessive degree of it is evident.

The objects of my invention are, first, to provide speed changing mechanism; second, to provide automatic means controlled by slippage of two members in their frictional engagement for causing said speed changing mechanism to operate to reduce the ratio of the speed of a driven shaft to the speed of a driving shaft; and, third, to provide automatic means controlled by a yieldable member for causing the said speed changing mechanism to operate to increase the ratio of the speed of the driven shaft to the speed of the driving shaft.

I attain these objects, and others as may herein appear, by the mechanism illustrated in the accompanying drawings, in which—

Figure 1 is a side elevation and partly sectional view of my complete device; Figure 2 is a front elevation and partly sectional view of the same or may be described as a section taken on the line 2—2 of Figure 1; Figure 3 is a plan section taken on the line 3—3 of Figure 1; Figure 4 is a plan section taken on the line 4—4 of Figure 1; Figure 5 is an enlarged cross-sectional detail view taken on the line 5—5 of Figure 2; Figure 6 is a plan section taken on the line 6—6 of Figure 1; Figures 7 and 8 are detail views illustrating different positions of the segmental gears from the position shown in Figure 3; and Figure 9 is an enlarged sectional detail taken on the line 9—9 of Figure 6.

Similar numerals refer to similar parts throughout the several views.

11 designates a driving shaft having a friction disk 12 splined thereon and urged away from a collar 13 on the shaft 11 by a spiral spring 14 interposed between the collar 13 and the disk 12. The collar 13 is adjustable, being secured upon the shaft 11 by a set-screw 15.

A shaft 16 is rotatably journaled in the frame 17 of the machine and is provided with screw threads 18 and a keyway 19 cut through and below the said threads 18. A bevel gear wheel 20 is secured upon the shaft 16 and engages a bevel gear wheel 21 upon a shaft 22 leading to the mechanism to be driven through this automatic transmission mechanism.

A friction wheel 23 is mounted for free rotation on the shaft 16 and is longitudinally slidable thereon, engaging the disk 12 which is pressed against it by the spring 14. A collar 24 having a lower portion of small diameter and an upper portion of greater diameter is loosely mounted upon the shaft 16 with its lower surface in contact with the upper flat surface of the friction wheel 23 and its upper surface in contact with the lower flat surface of a segmentally toothed wheel 25 secured to a collar 26 splined upon the shaft 16 by means of a feather 27 engaging the keyway 19 in the shaft 16. A spiral spring 28 surrounds the shaft 16 and presses against the collar 26, and against a loose washer 29 on the shaft 16. An externally threaded sleeve 30 is mounted loosely upon the shaft 16 and passes through an internally threaded opening 31 in a slidable frame 32 to be later described. The threads of the sleeve 30 engage the internal threads of the opening 31 and the lower end of the sleeve 30 abuts against the washer 29 while the upper end of the sleeve 30 is provided with a milled portion 33 for convenience in adjusting.

A coil spring 34 has its outer end secured to a pin 35 projecting from the flat upper surface of the friction wheel 23 and its inner end secured to the periphery of the collar 24 in such manner that the spring 34 will tend to become wound upon the collar 24 when the friction wheel 23 is rotated in its normal direction, as indicated by arrows in Figures 2, 3, 4, 7 and 8.

A threaded shaft 36 passes through an internally threaded opening 37 through the friction wheel 23 with its lower end projecting below the friction wheel 23 and having a small segmental gear wheel 38 secured upon it near its upper end for rotation therewith, the segmental gear 38 being adapted to engage with the teeth of the segmentally toothed wheel 25. A portion 39 of the segmental gear 38 has spiral springs 40 secured to either side thereof and to pins 41 projecting from the upper flat surface of the friction wheel 23.

An internally threaded wheel 42, having a hub 43, is mounted upon the shaft 16 in screw engagement with the threads 18 thereof and is provided with spaced teeth 44 around and upon the upper face of the wheel 42 which are adapted to be engaged by the threaded shaft 36 under certain conditions to be later explained.

A slidable frame 32 embraces the threaded sleeve 30, the internally threaded wheel 42 and all of the members mounted upon the shaft 16 between the sleeve 30 and the wheel 42 and maintains them in fixed spaced relationship to each other throughout their movements longitudinally of and upon the shaft 16. A loose collar 45 surrounds the shaft 16 between the wheel 42 and the frame 32. A pin 46 having an enlarged head 47 passes through an opening 48 in the frame 32 and is surrounded by a light spiral spring 49 which presses against the head 47 and the frame 32 and forces the head 47 against the smooth under surface of the wheel 42, acting as a light brake therefor.

The slidable frame 32 is provided with bifurcated arms 50 which straddle a rod 51 set in the machine frame 17 parallel with the shaft 16, permitting movement of the frame 32 longitudinally of and upon the shaft 16 but not permitting rotation of the frame 32. A collar 52 is fixed upon the shaft 16 and a spiral spring 53 surrounds the shaft 16 resting upon the collar 52 and a collar 54 loose upon the shaft 16 rests upon the spring 53. The bottom of the frame 32 is adapted to contact with the loose collar 54 when the friction wheel 23 approaches almost to the axis of the friction disk 12.

In considering the operation of this mechanism, it will be advantageous to first assume that the shaft 11 is being rotated in clock-wise direction by a motor or engine, carrying the disk 12 with it in rotation and with the disk 12 pressed into frictional engagement with the friction wheel 23 by the spring 14, it being remembered that the disk 12 is splined upon the shaft 11 and slidable longitudinally thereon, and that the friction wheel 23 is engaging the disk 12 at a point near the periphery of the disk 12, as illustrated in Figures 1 and 2.

The friction wheel 23, free on the shaft 16, is driven by the disk 12 and, through the spring 34, carries with it the collar 24. The degree to which the spring 34 will be tensioned at this time will, of course, depend upon the degree of resistance being offered to the rotation of the collar 24 with the friction wheel 23. There will always be greater resistance offered to the turning of the collar 24 by the friction wheel 23 than the collar 24 can offer to the turning of the friction wheel 23 by reason of the differences in the friction areas presented by the collar 24 to the friction wheel 23 and to the segmentally toothed wheel 25 which presses against the larger upper surface of the collar 24. Hence, it will be much easier for the friction wheel 23 to rotate independently of the collar 24, in so far as the frictional engagement between them is concerned, than for the collar 24 to rotate independently of the segmentally toothed wheel 25.

The collar 24, therefore, tends to carry with it in rotation the segmentally toothed wheel 25 and the collar 26 through frictional engagement under pressure of the spring 28 and, since the collar 26 is splined upon the shaft 16, that shaft must rotate with the collar 26 and, through the engagement of the bevel gear wheels 20 and 21, the shaft 22 must rotate with the shaft 16, although at different speed as determined by the respective diameters of the bevel gear wheels 20 and 21.

Before the spring 34 can gain sufficient tension to transmit the rotary motion of the friction wheel 23 to the collar 24 it must permit the friction wheel 23 to rotate somewhat independently of the collar 24 and of the segmentally toothed wheel 25. Hence, the rotary relationship of the friction wheel 23 and the wheel 25 would be changed from the normal rotary relationship illustrated in Figure 3 to that illustrated in Figure 7 or thereabouts. Such relative rotation of the friction wheel 23, carrying the segmental gear 38 on the shaft 36 with it, would cause the segmental gear 38 to be partially rotated, as seen in Figure 7, by engagement with the teeth of the segmentally toothed wheel 25. This partial rotation of the gear 38 is sufficient to spiral the threaded shaft 36 downwardly through the internally threaded opening 37 in the friction wheel 23 to allow the end of the shaft 36 to engage between the teeth 44 on the internally threaded wheel 42, thus locking the wheel 42 to the friction wheel 23 for rotation therewith. So long as there is no slippage in the frictional engagement of the collar 24 with the segmentally toothed wheel 25, both the threaded shaft 16 and the internally threaded wheel 42 will rotate in unison and there will, therefore, be no travel of the internally threaded wheel 42 either upwardly or downwardly upon the shaft 16.

Now, should slippage develop in the frictional engagement between the collar 24 and the segmentally toothed wheel 25, through increased resistance to the rotation of the shaft 22, the shaft 16 will be driven as much slower than the internally threaded wheel 42 as the slippage amounts to and, hence, the internally threaded wheel 42 will spiral downwardly on the shaft 16, carrying with it the sliding frame 32 and all it embraces, thus moving the friction wheel 23 nearer to the axis of the disk 12 where it is driven at decreased speed but with correspondingly greater torque. When this increased torque becomes sufficient to equalize the increased resistance to rotation of the shaft 22 the slippage between the collar 24 and the wheel 25 will cease and the speeds of the shaft 16 and the wheel 42 will again be equal, when spiral movement of the wheel 42 will cease. Any further increase in resistance to rotation of the shaft 22 will, of course, act in the same way as above described to bring the friction wheel 23 still nearer to the axis of the disk 12 and to reduce the ratio of its speed to the speed of the disk 12 while increasing the ratio of the torque of the friction wheel 23 to the torque of the disk 12.

Now, should the resistance to rotation of the shaft 22 decrease, the tension of the spring 34 will add its torsional urge to the torque transmitted from the friction wheel 23 to the collar 24 through the spring 34 and will thus cause the collar 24 to rotate faster than the friction wheel 23 while the spring 34 recovers from a part of its tension. As this will also cause the segmentally toothed wheel 25 to rotate faster, the effect will be to rotate the segmental gear 38 and shaft 36 in the direction shown in Figure 8, thus spiralling the shaft 36 out of engagement with the teeth 44 of the internally threaded wheel 42 and unlocking the wheel 42 from the friction wheel 23. The resistance offered to the rotation of the wheel 42 by the spring pressed pin 48 is sufficient to stop or retard the wheel 42, with the result that the shaft 16 will now be rotating faster than the wheel 42, causing that wheel and the frame 32, with all that the said frame embraces, to move upwardly upon the shaft 16 until the increasing resistance retensions the spring 34, allowing partial rotation of the friction wheel 23 independently of and beyond the rotation of the collar 24, thus again locking the internally threaded wheel 42 to the friction wheel 23 and restoring equality of rotational speeds between the shaft 16 and wheel 42.

Thus, each change in the resistance offered to the rotation of the shaft 22 is automatically met by movement toward or away from the axis of the disk 12 by the friction wheel 23, with consequent changes in the speed and torque ratios of the said shaft to the said disk.

The spring 14 should be so adjusted as to tension, by moving the collar 13 on the shaft 11, as to insure that it will always be somewhat easier for the collar 24 to slip in its engagement with the segmentally toothed wheel 25 than for the friction wheel 23 to slip in its engagement with the disk 12. Also, the spring 28 should be so tensioned as to barely allow the collar 24 to slip against the segmentally toothed wheel 25 a little easier than the friction wheel 23 can slip against the disk 12.

The spring 53 on the shaft 16 is provided so that, should the friction wheel 23 be brought down to the axis of the disk 12 under a very great resistance to rotation of the shaft 16, recovery may be made when said resistance is removed or reduced. As the friction wheel 23 would be receiving no rotary impulse when at this dead center, the ordinarily operative spiralling means would not get it out of this position, even though all resistance was removed. However, slightly before such dead center is reached, the frame 32 contacts with the loose collar 54 and further downward movement of that frame compresses the spring 53. When the cause for the downward movement is removed, the spring 53 forces the frame 32 and its contents upwardly enough to remove the friction wheel 23 from the dead center, the internally threaded wheel 42 (then loose from the friction wheel 23) rotating idly to permit such upward movement.

It will be evident that numerous departures from the specific construction described herein might be made without departing from the spirit of my invention. I do not, therefore, wish to be limited to this construction or to acquiesce in any limitations whatever except such as may be imposed by the state of the prior art or by the claims forming a part hereof.

I claim:

1. In automatic transmission mechanism, the combination of a friction driving member, a friction wheel rotatable by and movable radially of said friction driving member, a driven shaft mounting said friction wheel, a friction member upon said driven shaft frictionally driven by said friction wheel, and means becoming operative upon any slippage whatever in the frictional drive of the said friction member for moving the said friction wheel radially of the said friction driving member and toward the axis thereof.

2. In automatic transmission mechanism, the combination of a friction driving member, a friction wheel rotatable by and movable radially of the said friction driving member, a threaded shaft frictionally rotatable with said friction wheel, an internally threaded member mounted upon said threaded shaft in screw engagement therewith, means for locking said internally threaded member to said friction wheel for rotation therewith, means operating through any slippage in the frictional drive of the said threaded shaft for moving the said friction wheel radially of the said friction driving member and toward the axis thereof, means controlled by any diminution in the resistance offered to the rotation of the said threaded shaft for unlocking the said internally threaded member from the said friction wheel, means for retarding the speed of rotation of the said internally threaded member relative to the speed of rotation of the said threaded shaft, and means controlled by such retardation for moving the said friction wheel radially of the said friction driving member and away from the axis of said friction driving member.

3. In automatic transmission mechanism, the combination of a driving shaft, a driven shaft, frictionally engaging members adapted to transmit rotary motion from said driving to said driven shaft through variable speed mechanism, and automatic means for adjusting the said variable speed mechanism to reduce the ratio of the rotary speed of the said driven shaft to the rotary speed of the said driving shaft proportionally to all slippage between the said frictionally engaging members.

4. In automatic transmission mechanism, the combination of a threaded shaft, a member splined upon said shaft, an element loosely mounted upon said shaft and frictionally engaging said member, a wheel loosely mounted upon said shaft, resilient means coupling the said element to the said wheel for rotation thereby, an internally threaded member mounted upon said shaft and in screw engagement therewith, means controlled by slippage in the frictional engagement of the said splined member and the said element for causing the said internally threaded member to spiral upon the said shaft in one direction, and means controlled by loss of tension of the said resilient means for causing the said internally threaded member to spiral in the opposite direction upon the said shaft.

5. In automatic transmission mechanism, the combination of a rotatable member, a rotatable element, a threaded shaft loosely mounting said member and said element, resilient means coupling said member and said element, an internally threaded member upon said shaft and in screw engagement therewith, means for coupling or uncoupling the said rotatable member and the said internally threaded member, and means controlled by gain in tension of said resilient means for actuating said last named means to couple said internally threaded member and said rotatable member together and controlled by loss of tension of said resilient means for actuating said coupling and uncoupling means to uncouple the said internally threaded member and the said rotatable member.

6. In automatic transmission mechanism, the combination of a driving shaft, a driven shaft, speed changing mechanism, two members in yieldable engagement with each other, means controlled by the yield of the said members in their said engagement for automatically adjusting the said speed changing mechanism to decrease the ratio of the speed of the said driven shaft to the speed of the said driving shaft, two elements, resilient means coupling the said two elements, and means becoming operative through partial recovery of the said resilient means from a tensional condition thereof for automatically adjusting the said speed changing mechanism to increase the ratio of the speed of the said driven shaft to the speed of the said driving shaft.

7. In automatic transmission mechanism, the combination of a driving friction member, a friction wheel driven by said friction driving member through frictional engagement therewith, two friction elements, and automatic means actuated by any slippage whatever of the said friction elements in their engagement with each other for so adjusting the position of the said friction wheel relative to the axis of the said driving friction member as to overcome the slippage of the said friction element.

8. In automatic transmission mechanism, the combination of a driving shaft, a driven shaft, a driving member carried by said driving shaft, a feathered member splined upon said driven shaft, an element loosely mounted upon said driven shaft, a rotatable member loosely mounted upon said driven shaft and rotatable by said driving member, resilient means for yieldably coupling the said element to the said rotatable member for rotation thereby, means for pressing the said feathered member into frictional engagement with the said element, and means whereby any degree of slippage in the frictional engagement of the said element and the said feathered member will automatically so adjust the said rotatable member with respect to the said driving member as to diminish the ratio of the rotary speed of the said driven shaft to the rotary speed of the said driving shaft in fixed proportion to the degree of said slippage.

9. In automatic transmission mechanism, the combination of a driving member, a driven member frictionally engaging said driving member, a rotatable member frictionally engaging said driven member, and means becoming operative upon the slightest degree of slippage in the frictional engagement of the said driven member and the said rotatable member under varying degrees of resistance offered to the rotation of the said rotatable member for automatically so reducing the ratio of the speed of the said driven member to the speed of the said driving member and increasing the ratio of the torque of the said driven member to the torque of the said driving member as to overcome the said slippage.

10. In automatic transmission mechanism, the combination of a driving shaft, a driven shaft, speed changing mechanism comprising frictionally engaging members, and automatic means operated by the slightest degree of slippage in the frictional engagement of the said members for adjusting the said speed changing mechanism to reduce the speed of rotation of the said driven shaft relative to the speed of rotation of the said driving shaft.

11. In automatic transmission mechanism, the combination of a driving shaft, a driven shaft, speed changing mechanism, a friction member, a resilient member, automatic means controlled by slippage of the said friction member for reducing the ratio of the speed and increasing the ratio of the torque of the said driven shaft to the speed and torque respectively of the said driving shaft to counteract increases in the degree of resistance offered to the rotation of the said driven shaft, and automatic means controlled by said resilient member for increasing the ratio of the speed and decreasing the ratio of the torque of the said driven shaft to the speed and torque respectively of said driving shaft to counteract decreases in the degree of resistance offered to the rotation of the said driven shaft.

12. In automatic transmission mechanism, the combination of a rotatable driving friction member, a rotatable threaded shaft, a friction wheel loosely mounted upon said shaft and driven by and movable radially of the said driving friction member in continuous frictional engagement therewith, an internally threaded member mounted upon said shaft in screw engagement therewith and normally rotating at like speed and like direction to said shaft, means controlled by decreases in the resistance offered to the rotation of the said driven shaft for retarding the speed of rotation of the said internally threaded member relative to the speed of said shaft, and means becoming operative through the said retarding of said internally threaded member for moving the said friction wheel radially of and away from the axis of the said friction driving member.

13. In automatic transmission mechanism, the combination of a rotatable threaded shaft, an internally threaded member in screw engagement with said shaft, a rotatable member mounted upon said shaft, a resilient member, locking means adapted for coupling the said internally threaded member and the said rotatable member for rotation together, and automatic means controlled by the said resilient member for operating said locking means.

14. In automatic transmission mechanism, the combination of a rotatable threaded shaft, an internally threaded member in screw engagement with said shaft, a rotatable member mounted upon said shaft, a resilient member, locking means adapted for coupling the said internally threaded member and the said rotatable member together, and automatic means controlled by increasing tension of said resilient member for operating the said locking means to couple the said internally threaded member and the said rotatable member together and controlled by decreasing tension of said resilient means for operating the said locking means to uncouple the said internally threaded member and the said rotatable member.

15. In automatic transmission mechanism, the combination of a driving shaft, a driven shaft, speed ratio varying mechanism interposed between the said shafts, two frictionally engaging members, and means becoming operative through any slippage in the frictional engagement of the said members for automatically adjusting the said speed ratio varying mechanism to reduce the ratio of the speed of the said driven shaft to the speed of the said driving shaft progressively and to effect such progressive reduction of the speed ratio of the said driven shaft at a rate proportional to the degree of slippage of the said frictionally engaging members.

16. In automatic transmission mechanism, the combination of a driving shaft, a driven shaft, speed ratio varying mechanism interposed between the said shafts, two yieldably engaging members, and means becoming operative through any yield in the yieldable engagement of the said members for automatically adjusting the said speed ratio varying mechanism to reduce the ratio of the speed of the said driven shaft to the speed of the said driving shaft progressively and to effect such progressive reduction of the speed ratio of the said driven shaft at a rate proportional to the degree of yield in the engagement of the said yieldably engaging members.

CHARLES H. GILL.